J. B. HORNBAKE.
Improvement in Window Sash Bearing.
No. 124,491. Patented March 12, 1872.
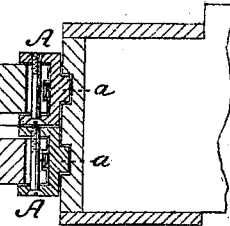
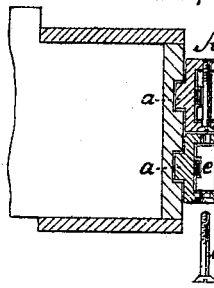
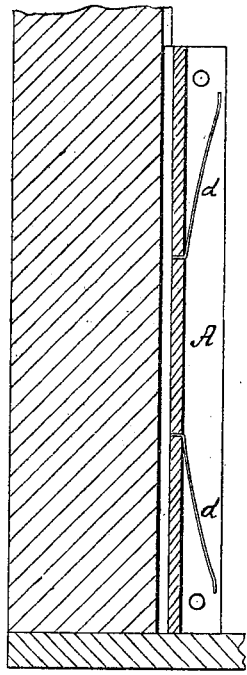
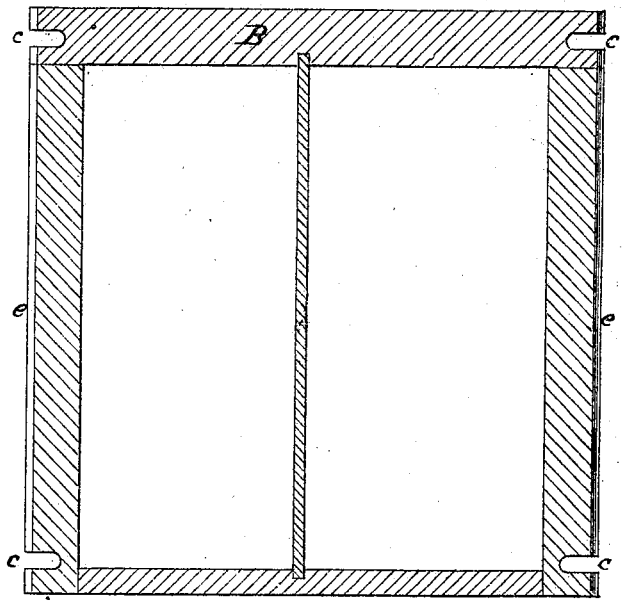
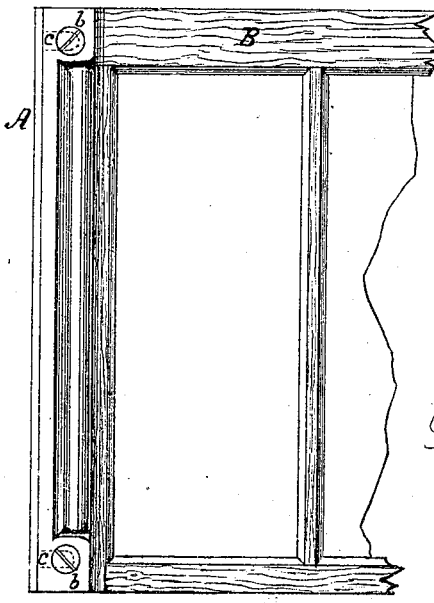
Witnesses:
Fredk. Artos
Geo. E. Brown
Inventor:
John B. Hornbake 124,491

UNITED STATES PATENT OFFICE.

JOHN B. HORNBAKE, OF GREENFIELD, PENNSYLVANIA.

IMPROVEMENT IN WINDOW-SASH BEARINGS.

Specification forming part of Letters Patent No. 124,491, dated March 12, 1872.

Specification describing a new Sash-Bearing, invented by JOHN B. HORNBAKE, of Greenfield, Washington county, Pennsylvania.

This invention consists of bearings of U-shape, designed to be placed at each side of a window-sash, between it and the window-frame, and provided with springs, which bear on the edges of the sash and press the bearings against the window-frames with sufficient force to prevent the passage of rain and wind between the sash and frame, and consequently render the ordinary weather and guide strips unnecessary.

Figure 1 is a horizontal section. Fig. 2 is a vertical section, and Fig. 3 is a front view.

A are the bearings aforesaid, the same being composed of tin or sheet-iron, stamped in the shape shown—that is to say, of a general U-shape—having along their back sides longitudinal tongues $a$, the function of which is to fit in grooves cut for their reception lengthwise of the window-frames, by means of which tongues and grooves the sashes and bearings are guided as they move up and down. The exterior surfaces of the outside and inside faces of the bearings are struck with moldings for ornament, thus rendering any elaborate finish of the sash unnecessary. Bolts or screws $b$ are placed crosswise of each bearing, near its top and bottom, connecting the two faces, which bolts enter grooves $c$ formed transversely of the edges of the sashes B, thus connecting the latter with the bearings. Springs $d$, riveted to the inner surfaces of the outer edges of the bearings, press against the sash, and force the bearings against the frames with sufficient power to stop the entrance of the external atmosphere, snow, dust, &c.; hence no weather or guide strips are required when my bearings are used. A groove, $e$, is made along one edge of each sash.

To apply these bearings to a window, in the case of the lower sash, first put in place in the frame one of the bearings on the grooved side of the sash, taking care to raise the bearing so that its lower end will clear the lower sash, recesses being made in the tops of the window-frames to receive the tops of the bearings when thus raised. Then put the sash, with one of the bearings attached to its ungrooved edges, into the window, and slip the raised bearing down between the sash and frame, the groove $e$ receiving the springs of the bearing that is thus lowered. The upper sash is first put in at the bottom of the window, and then raised to the side of its bearing. To take out the sashes, reverse the process.

As the springs cause the sashes to remain in whatever position they may be placed, balancing-weights or springs, with cords, can be dispensed with by the use of my invention; or they can be used, if desired.

I claim as my invention—

As a new article of manufacture, the bearing A, stamped out of sheet metal and having its exterior faces struck in moldings, and provided with the tongue $a$ and combined with the spring $d$, all as specified.

JOHN B. HORNBAKE.

Witnesses:
 GEO. E. BROWN,
 EDM. F. BROWN.